United States Patent
Lo et al.

(10) Patent No.: US 7,495,898 B2
(45) Date of Patent: Feb. 24, 2009

(54) PORTABLE COMPUTER HAVING IMPROVED LATCH MECHANISM

(75) Inventors: Wen-Kang Lo, Tu-Cheng (TW); Ke-Cheng Lin, Tu-Cheng (TW); Xiao-Gang Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 489 days.

(21) Appl. No.: 11/292,259

(22) Filed: Dec. 1, 2005

(65) Prior Publication Data

US 2006/0125585 A1    Jun. 15, 2006

(30) Foreign Application Priority Data

Dec. 11, 2004    (CN)    ............ 2004 2 0102733

(51) Int. Cl.
*H05K 5/00* (2006.01)
*H05K 7/00* (2006.01)
(52) U.S. Cl. .................. 361/683; 361/679
(58) Field of Classification Search ............ 361/680, 361/681, 683, 679; 70/58, 67, 69–74

See application file for complete search history.

(56) References Cited

U.S. PATENT DOCUMENTS

| 5,580,182 | A | * | 12/1996 | Lin | ............. | 403/325 |
| 6,076,869 | A |   | 6/2000 | Chen et al. | | |
| 6,714,408 | B1 | * | 3/2004 | Wang et al. | .......... | 361/683 |
| 7,261,573 | B2 | * | 8/2007 | Lin et al. | ............ | 439/135 |
| 2003/0142472 | A1 | * | 7/2003 | Park | ............ | 361/683 |
| 2005/0152120 | A1 | * | 7/2005 | Lee | ............ | 361/725 |
| 2005/0276010 | A1 | * | 12/2005 | Song | .......... | 361/683 |

FOREIGN PATENT DOCUMENTS

CN        01208955.9    3/2002

* cited by examiner

*Primary Examiner*—Jayprakash N Gandhi
*Assistant Examiner*—Anthony M Haughton

(57) ABSTRACT

A portable computer includes a cover unit (10) and a base unit (20) connected with the cover unit. The cover unit includes a movable latch member (4), a driving button (50), and a driving bar (60). The driving bar and the driving button are oppositely and slidably fixed to cover unit. The latch member includes a following portion (46). The driving bar includes a driving portion (58) abutting and engaging with the following portion to move the latch member in a straight line. The cover unit is latched to the base unit via the latch members to cover the base unit and unlatched from the base unit via moving the latch member by manipulation of the driving button.

20 Claims, 6 Drawing Sheets

PORTABLE COMPUTER HAVING IMPROVED LATCH MECHANISM

CROSS-REFERENCE TO RELATED APPLICATION

Related subject matter is disclosed in a co-pending U.S. Patent Application having a Ser. No. 11/188,548, filed on Jul. 25, 2005 and entitled "PORTABLE COMPUTER HAVING IMPROVED LATCH MECHANISM", assigned to the same assignee with this application, and a co-pending U.S. Patent Application entitled "PORTABLE COMPUTER HAVING IMPROVED LATCH MECHANISM", also assigned to the same assignee with this application with Ser. No. 11/272,531, filed on Nov. 10, 2005.

BACKGROUND

1. Field of the Invention

The present invention relates to a portable computer, and more particularly to a portable computer which includes a reliable latch mechanism.

2. General Background

Portable computers, such as laptop computers and notebook computers, have become increasingly popular for general use. Generally, a portable computer includes a cover unit and a base unit pivotally connected with the cover unit, and the cover unit is folded onto the base unit to cover the base unit when the portable computer is not in use. A latch mechanism is provided to lock the cover unit to the base unit.

As disclosed in China Patent No. 01208955.9, a portable computer includes a latch mechanism which acts to lock a cover unit to a base unit when the portable computer is not in use. The latch mechanism includes a hook for engaging the base unit, and a post movably embedded in the base unit for disengaging the hook from the base unit. An end portion of the post is exposed outside the base unit for facilitating pushing the post to disengage the hook from the base unit. However, the end portion of the post is liable to be accidentally touched resulting in undesired opening of the cover unit.

What is desired, therefore, is a portable computer which has an improved reliable latch mechanism.

SUMMARY

In one preferred embodiment, a portable computer includes a cover unit, and a base unit connected with the cover unit. The cover unit includes a movable latch member, a driving button, and a driving bar. The driving bar and the driving button are oppositely and slidably fixed to cover unit. The latch member includes a following portion. The driving bar includes a driving portion abutting and engaging with the following portion to move the latch member in a straight line. The cover unit is latched to the base unit via the latch members to cover the base unit and unlatched from the base unit via moving the latch member by manipulation of the driving button.

Other advantages and novel features will become more apparent from the following detailed description of preferred embodiments when taken in conjunction with the accompanying drawings, in which:

DETAILED DESCRIPTION OF THE EMBODIMENT

Figure 1:
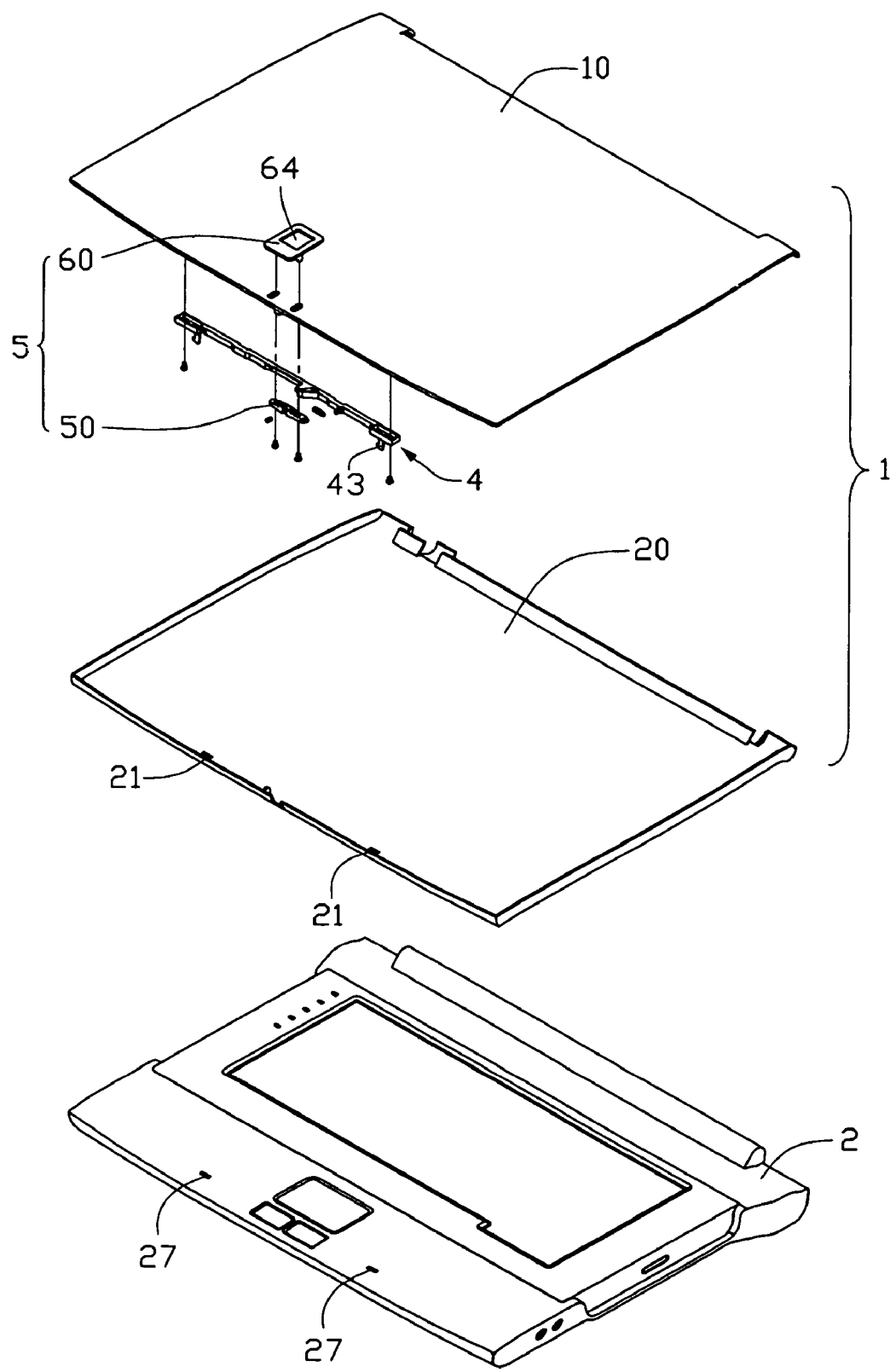
FIG. 1 is an exploded, isometric view of a portable computer in accordance with a preferred embodiment of the present invention, the portable computer including a base unit, a cover unit and a latch mechanism.
Figure 2:
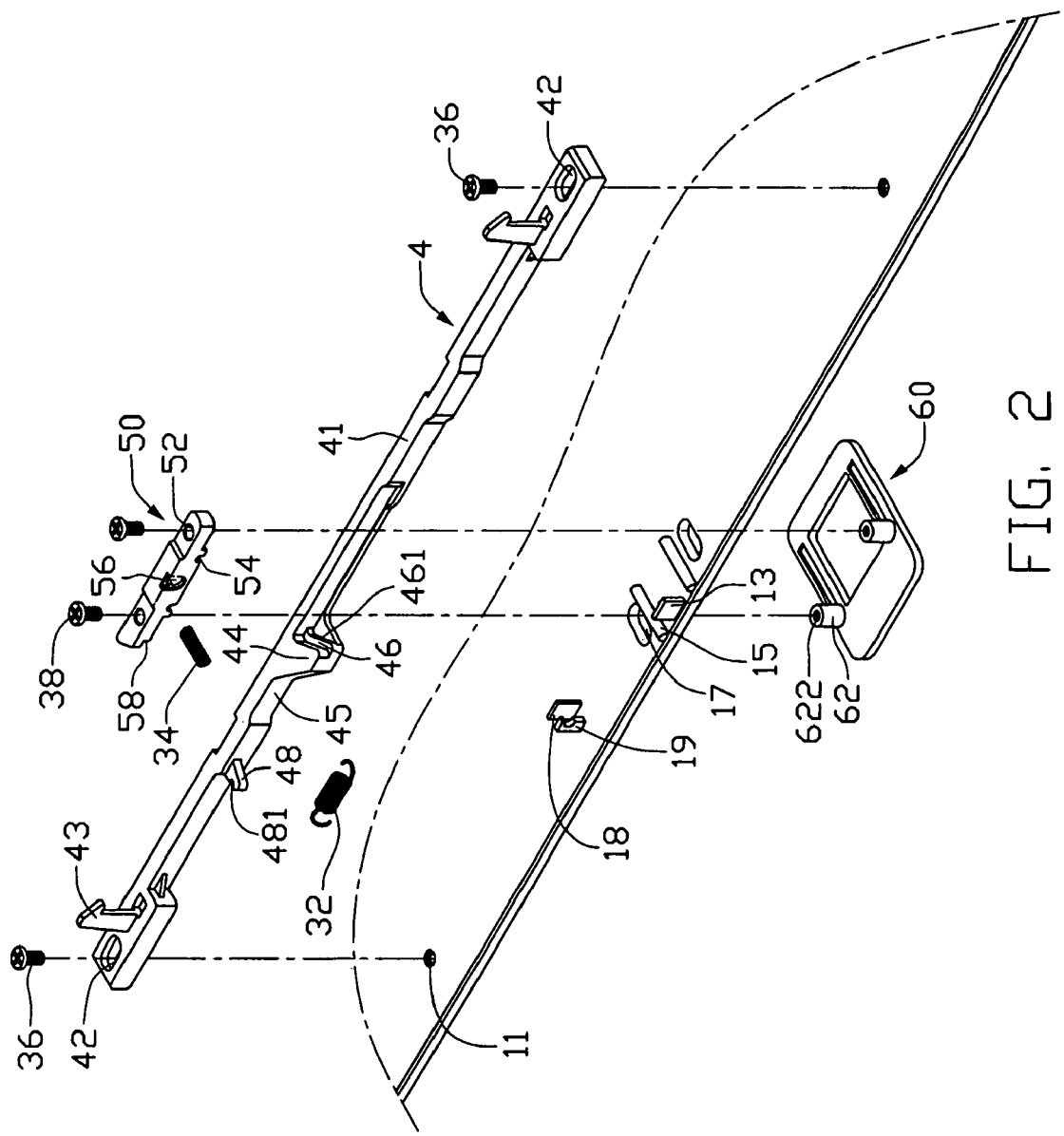
FIG. 2 is an enlarged isometric view of part of the cover unit and the latch mechanism of FIG. 1, but viewed from another aspect.

Referring to FIGS. 1 and 2, a portable electronic device like a portable computer includes a cover unit 1 and a base unit 2 pivotally connected to a rear portion of the cover unit 1. The cover unit 1 includes a latch mechanism disposed at a front portion thereof for locking the cover unit 1 to the base unit 2 when the portable computer is not in use.

The latch mechanism includes a latch member 4, and a driving member 5 generally disposed at external surface of the cover unit 1 for facilitating manipulating the latch mechanism. The driving member 5 further includes a driving bar 50, and a driving button 60, and oppositely attached to the cover unit 1. The driving button 60 is generally arranged at an external surface of the cover unit 1 for facilitating manipulating the driving member 5, and the driving bar 50 is generally arranged inside the cover unit 1.

The cover unit 1 includes a panel 10 and a housing 20. A pair of spaced threaded holes 11 is defined at an internal side of the panel 10 adjacent a front edge. A stop 13 depends from the internal side of the panel 10 between the threaded holes 11. A pair of ridges 15 extrudes from the internal side of the panel 10 besides the stop 13 respectively. A pair of first slots 17 is defined in the internal side of the panel 10 beside and along each ridge 15 respectively. A tab 18 and a first projection 19 depend from the internal side of the panel 10 between one of the threaded hole 11 and corresponding first slot 17, parallel to each other. A first notch 191 is defined in the first projection 19.

Referring particularly to FIG. 1, the housing 20 defines a pair of apertures 21.

Referring to FIG. 2, the latch member 4 includes a longitudinal body 41. A pair of second slots 42 is defined in a two opposite ends of the longitudinal body 41, corresponding to a respective threaded hole 11 of the panel 10. A pair of hooks 43 is arranged adjacent the second slots 42, and corresponding to respective apertures 21 of the housing 20. A protrusion 44 and a second projection 48 extrude horizontally from a side of the body 41. A guider wall 45 and a following portion 46 are separately formed in opposite sides of the protrusion 44. The guider wall 45 is a curved configuration, corresponding to the tab 18 of the panel 10. The following portion 46 includes a pair of grading slopping walls 461. A second notch 481 is defined in the second projection 48 in cooperation with the first notch 191 of the panel 10 to attach a coil spring 60 therebetween.

Figure 3:
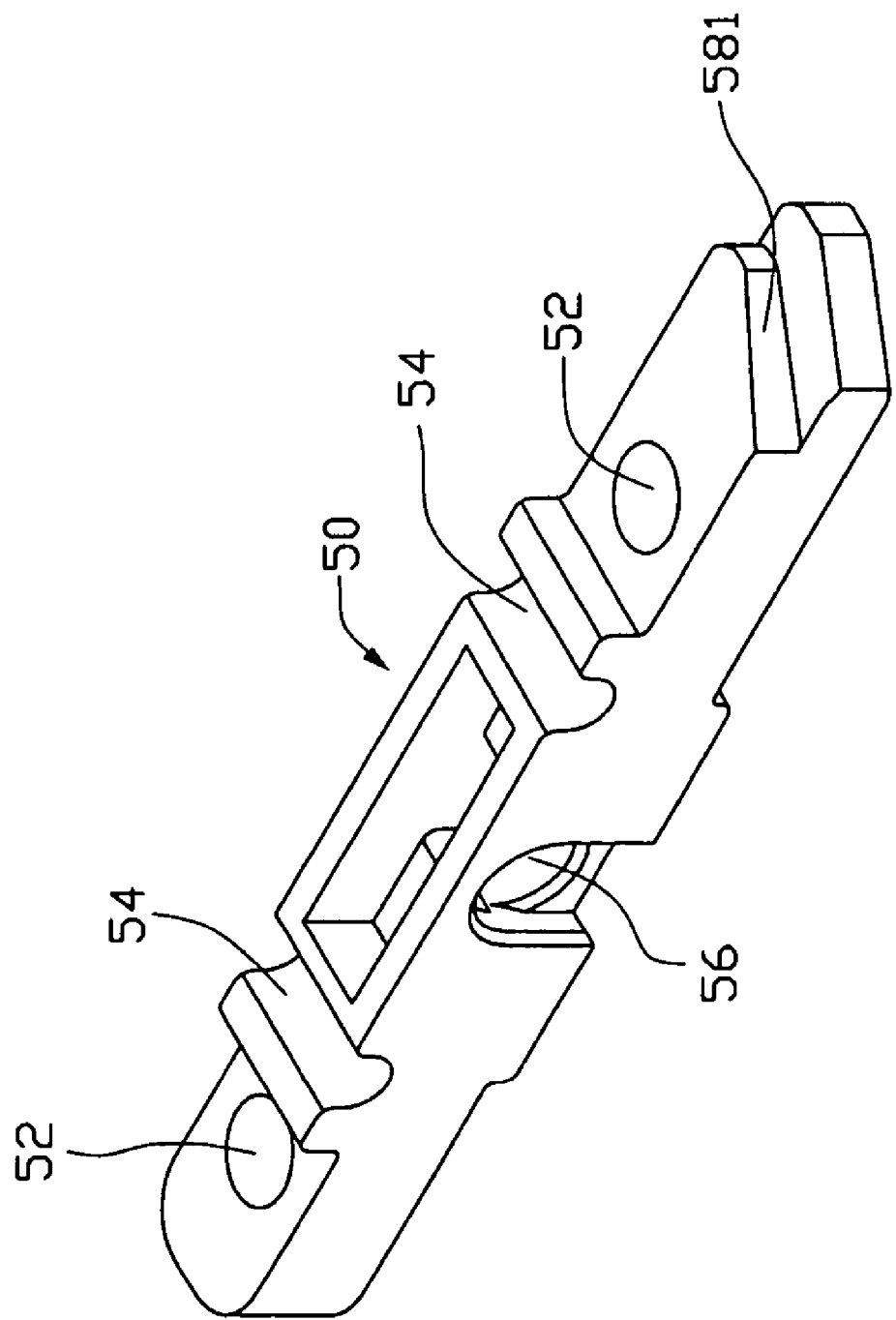
FIG. 3 is an enlarged isometric view of part of the latch mechanism of FIG. 2, but viewed from another aspect.

As shown in FIG. 2 and FIG. 3, the driving bar 50 includes a pair of through holes 52 defined in a two opposite ends thereof. A pair of channels 54 is separately defined in a top portion of the driving bar 50, corresponding to the ridges 15 of the panel 10. A recess 56 is defined in a side portion of the driving bar 50. A driving portion 58 is formed at one end of the driving bar 50, corresponding the following portion 46 of the latch member 4. The driving portion 58 accordingly includes a pair of slope walls 581, for mating with the slopping walls 461 of the latch member 4.

As shown in FIG. 2, the driving button 60 includes a generally rectangle configuration. A pair of posts 62 depends at two opposite side edges of driving button 60, corresponding to the first slots 17 of the panel 10. A threaded hole 622 is defined in each post 62. A handgrip portion 64 is formed at an outer surface of the driving portion 60.

Referring back to FIG. 1, the base 2 defines a pair of apertures 27 at a front portion thereof corresponding to the hooks 43 of the latch member 4 respectively as complementary parts of the latch member 4.

Figure 4:
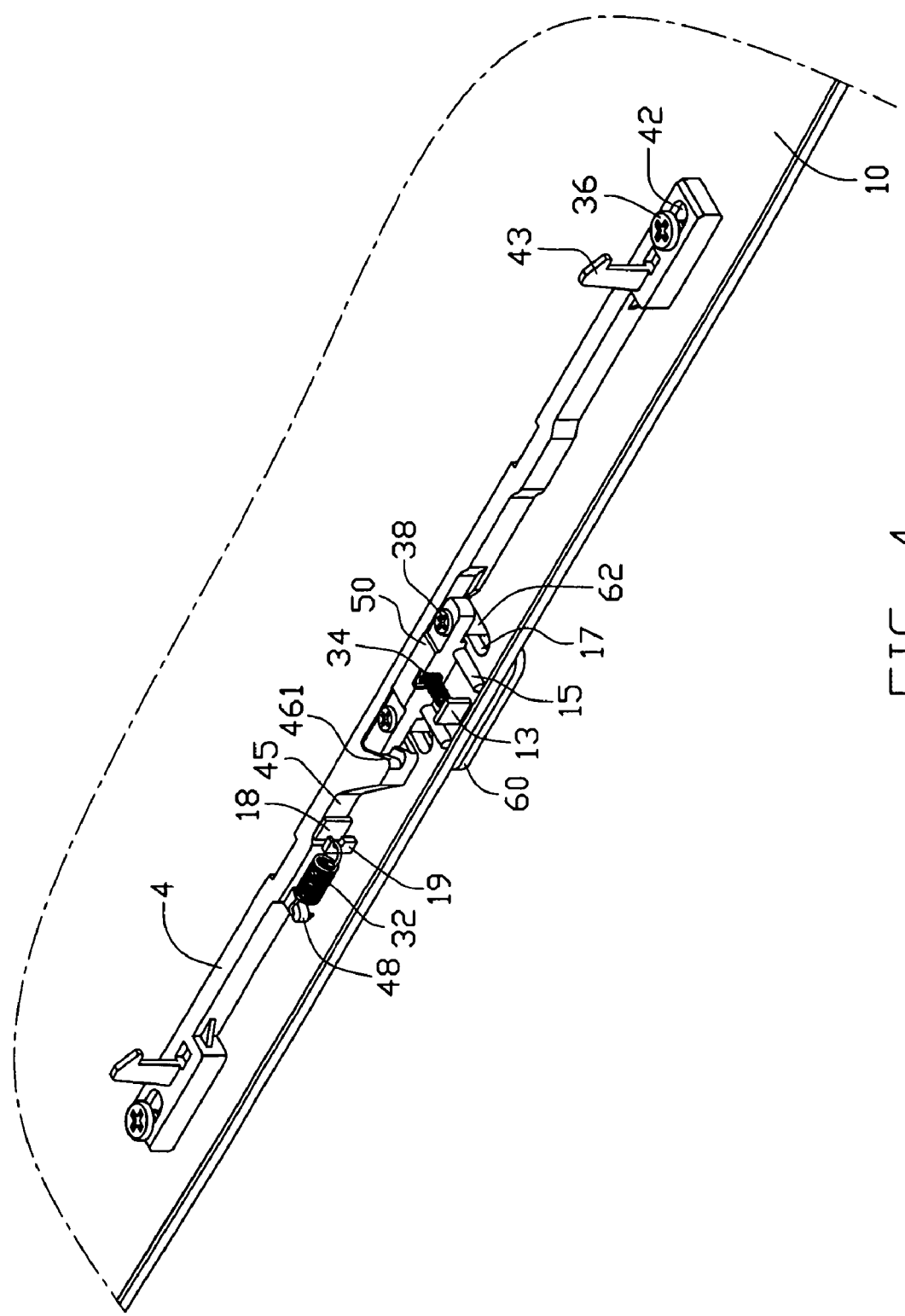
FIGS. 4 and 5 are assembled views of FIG. 2, respectively schematically showing the latch mechanism in different working states.
Figure 5:
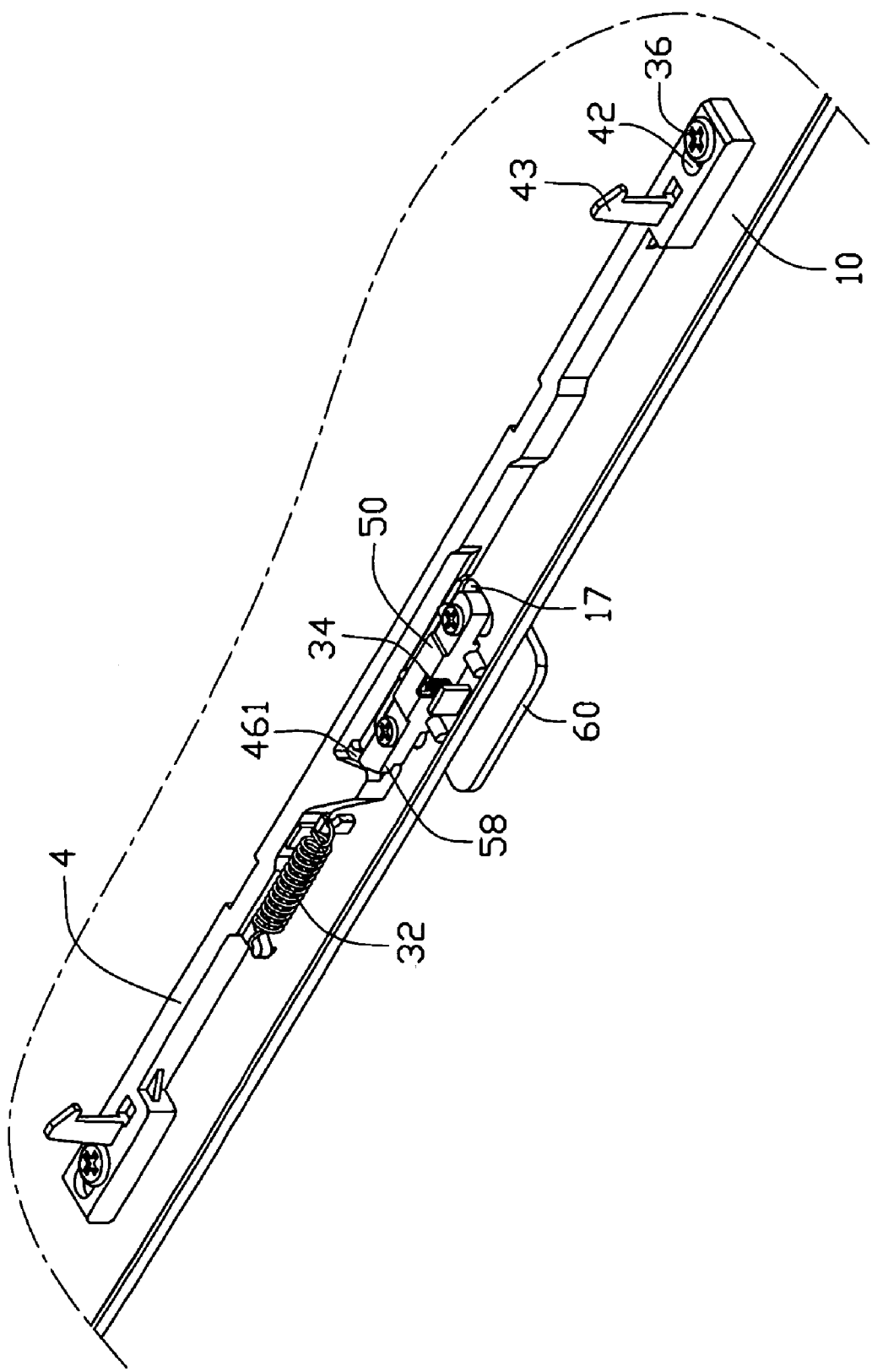

Referring to FIGS. 4 and 5, the latch member 4 is movably attached to the panel 10 with two fasteners 36 slidably engaging in the threaded holes 11 respectively. The guider wall 45 slidably moves along the tab 18 of the panel 10. The coil spring 32 is fixed to the first projection 19 and the second projection 48, with its two free ends engaging in the first notch 191 and the second notch 481 respectively.

The driving bar 50 and the driving button 60 are fixed to the panel 10. The driving button 60 movably engages an external surface of the panel 10. Two fasteners 38 extend through the through holes 52 to engage in the threaded holes 622 of the posts 62 movably received in the first slots 17 of the panel 10. The ridges 15 of the panel 10 are movably received in the channels 54 of the driving bar 50. A torsion spring 34 is disposed between the panel 10 and the driving bar 50, with its two free ends separately engaging with the stop 13 and the recess 56. The driving portion 58 of the driving bar 50 slidably mates with the following portion 46 of the latch member 4. The tab 18 contacts the guiding wall 45 of the latch member 4. FIG. 4 and FIG. 5 separately show an assembled view of FIG. 2.

The housing 20 is then assembled with the panel 10 to form the cover unit 1, and the hooks 43 of the latch member 4 protrudes outward from the apertures 21 of the housing 20 respectively.

Figure 6:
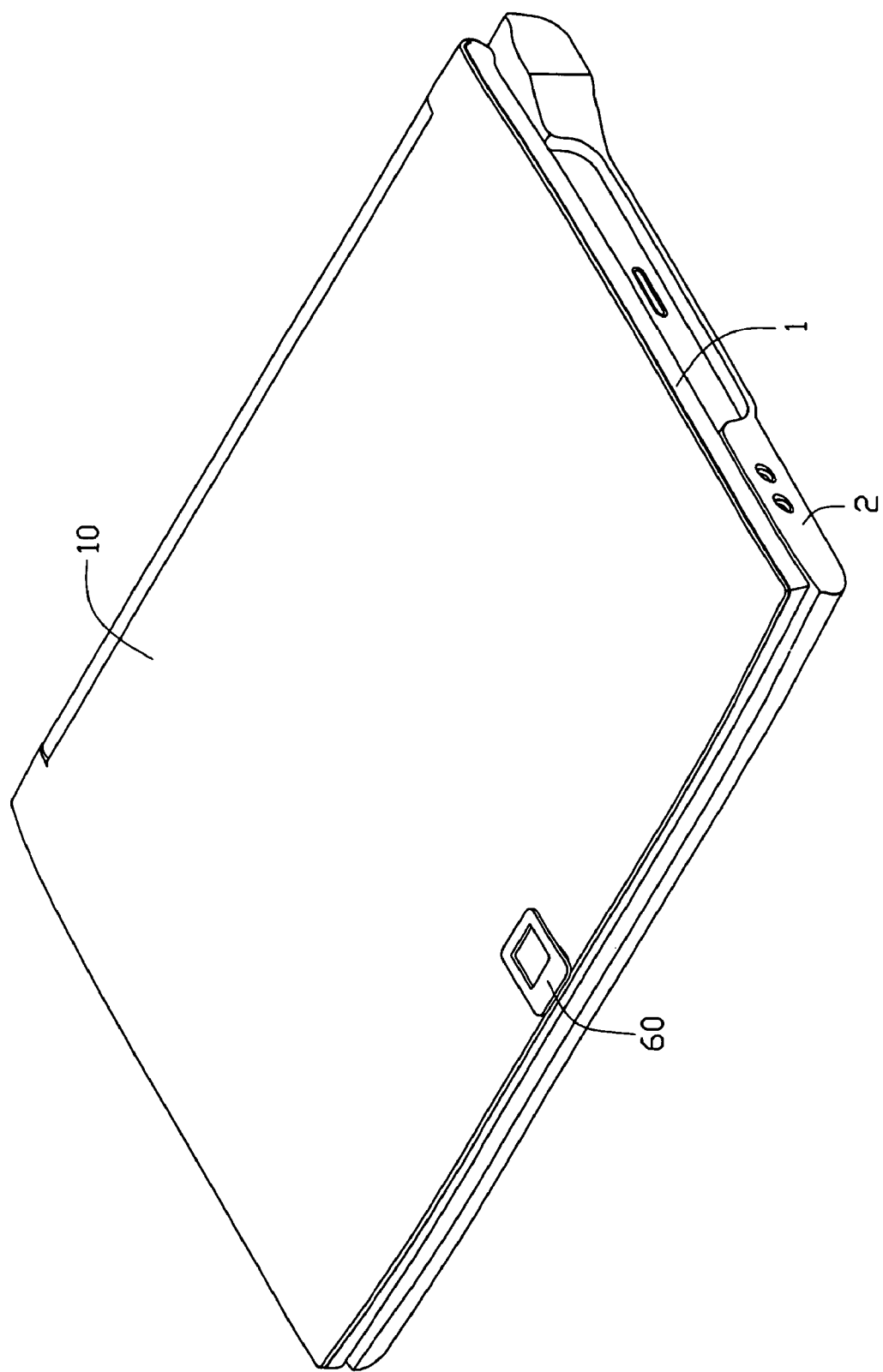
FIG. 6 is an assembled view of FIG. 1.

As shown in FIG. 6, the cover unit 1 is pivotally attached to the base unit 2, and the cover unit 1 is folded to cover the base 2, with hooks 43 engaging in the apertures 27 and latching the base unit 2. FIG. 4 shows the working state of the latch mechanism when the cover unit 1 covers the base unit 2.

To open the cover unit 1 from the base unit 2, the driving button 60 is outwardly drawn by the handgrip portion 64 in a first direction. Accordingly, the driving bar 50 is moved outwardly. As shown in FIG. 5, the torsion spring 34 is depressed. The driving portion 58 of the driving bar 50 engages the following portion 46 of the latch member 4, with the slopping walls 581 of the driving bar 50 abutting and sliding along the slopping walls 461 of the latch member 4. The latch member 4 is moved to stretch the coil spring 32 in a second direction perpendicular to the first direction, and the guider wall 45 moves along the tab 18 of the panel 10 in a straight line. The hooks 43 are thereby disengaged from the apertures 27 of the base unit 2 respectively. The cover unit 1 is ready to be opened. When the driving button 50 is released, the torsion spring 34 is restored to move the driving button 50 toward to its original position, and the coil spring 32 is restored to move the latch member 4 back respectively.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A portable computer, comprising:
   a cover unit comprising a latch member, and a driving member, the driving member comprising a driving portion and sliding in a first direction, the latch member comprising a following portion moved by the driving portion in second direction perpendicular to the first direction; and
   a base unit connected with the cover unit, the cover unit latched to the base unit via the latch member to cover the base unit and unlatched from the base unit via moving the latch member by manipulation of the driving member;
   the driving member comprising a driving button arranged at an external surface of the cover unit, and a driving bar arranged inside the cover unit, the driving bar comprising a pair of channels, the cover unit comprising a pair of ridges slidably engaging in the channels.

2. The portable computer as claimed in claim 1, wherein a pair of slots is defined in two ends of the latch member and elongated along said second direction, and a pair of fasteners is extended through the slots to slidably attach the latch member to the cover unit.

3. The portable computer as claimed in claim 2, wherein a spring is connected between the latch member and the cover unit, for restoring the latch member along the slots after the cover unit is unlatched from the base unit.

4. The portable computer as claimed in claim 1 wherein the driving portion is formed from the driving bar, the latch member comprises a protrusion, the following portion is defined in a side portion of the protrusion, the following portion and the driving portion each comprises at least one sloping wall to mate with each other.

5. The portable computer as claimed in claim 4, wherein the protrusion further comprises a guider wall formed on another side portion thereof opposite to the following portion, the cover unit comprises a tab for sliding along of the guider wall.

6. The portable computer as claimed in claim 1, wherein the driving button comprises a handgrip portion formed at an outer surface thereof 7. The portable computer as claimed in claim 1, wherein a spring is associated with the driving bar to restore the cover unit.

8. The portable computer as claimed in claim 7, wherein the driving bar comprises a recess defined in a side portion thereof, the cover unit comprises a stop extending therefrom, the spring is disposed between the recess and the stop.

9. The portable computer as claimed in claim 7, wherein the a pair of channels is defined in a bottom portion of the driving bar.

10. The portable computer as claimed in claim 7, wherein the driving bar further comprises a pair of through holes defined in two ends thereof the driving button comprises a pair of posts, each of the posts defines a threaded hole therein, and a pair of fasteners is extended through the through holes to engage in the posts slidably extending through the slots.

11. The portable computer as claimed in claim 1, wherein the latch member comprises a pair of hooks protruding outward from the cover unit, and a pair of apertures is defined in the base unit for receiving the hooks respectively.

12. A combination comprising:
   a cover unit;
   a latch member received in the cover unit, and a driving member slidably attached to the cover unit along a first direction and moving the latch member sliding along a second direction angled the first direction, the latch member comprising at least one hook protruding outward from the cover unit; and a base unit defining at least one aperture corresponding to said hook, said hook entering said aperture and latching the base unit to attach the cover unit to the base unit, and the driving member being slid to drive the latch member thereby unlatching said hook from the base unit the latch member comprising a protrusion with a guider wall, the cover unit comprising a tab sliding along the guider wall wherein the protrusion comprises a following portion defined in a first side portion thereof.

13. The combination as claimed in claim 12, wherein the driving member comprises a driving button, and a driving bar, the driving button is generally arranged at an external surface of the cover unit for facilitating manipulating the driving member, and the driving bar is generally arranged inside the cover unit.

14. The combination as claimed in claim 13, wherein a spring is associated with the driving bar to restore the cover unit.

15. The combination as claimed in claim 13, wherein the driving bar comprises a driving portion, the following portion and the driving portion each comprises at least one sloping wall to mate with each other.

16. The combination as claimed in claim 15, wherein the guider wall is formed on a second side portion of the protrusion opposite to the following portion.

17. The combination as claimed in claim 12, wherein a pair of slots is defined in two ends of the latch member, and a pair of fasteners is extended through the slots to slidably attach the latch member to the cover unit.

18. The combination as claimed in claim 17, wherein a spring is provided to restore the latch member along the fasteners after the cover unit is unlatched from the base unit.

19. The combination as claimed in claim 13, wherein the driving bar comprises a pair of channels defined in a bottom portion thereof, the cover unit comprises a pair of ridges slidably engaging in the channels.

20. An electronic device comprising:

a base unit enclosing a part of said electronic device;

a cover unit enclosing another part of said electronic device and movable between a first position thereof to abut against a side of said base unit and a second position thereof to expose said side of said base unit by moving away therefrom;

a latch member movably attachable to one of said base unit and said cover unit, said latch member movable along a first direction to engage with the other of said base unit and said cover unit in order for securing said cover unit to said base unit in said first position thereof, and along a reverse direction of said first direction to disengage from said other of said base unit and said cover unit in order for releasing said cover unit; and a driving member movably attachable to said one of said base unit and said cover unit beside said latch member and controllably reachable to said latch member, linear movement of said driving member along a second direction different from said first direction in a same predefined plane capable of urging movement of said latch member along a selective one of said first direction and said reverse direction thereof, said driving member comprising a driving bar, and a driving button exposable for user's control, said driving bar comprising a pair of through holes defined in two ends thereof, said driving button comprising a pair of posts, each post of said pair of posts defining a threaded hole therein, and a pair of fasteners extending through said through holes to engage in said threaded holes of said pair of posts respectively.

* * * * *